United States Patent [19]

Christenson et al.

[11] Patent Number: 4,762,421
[45] Date of Patent: Aug. 9, 1988

[54] TAG AXLE ASSEMBLY FOR WORK VEHICLES

[75] Inventors: Ronald E. Christenson, Mantorville; Garwin B. McNeilus, Dodge Center, both of Minn.

[73] Assignee: McNeilus Truck and Manufacturing, Inc., Dodge Center, Minn.

[21] Appl. No.: 70,331

[22] Filed: Jul. 6, 1987

[51] Int. Cl.$^4$ .............. B28C 5/18; B60S 9/00
[52] U.S. Cl. .................... 366/54; 180/209; 280/43.23; 280/81 R; 280/704
[58] Field of Search .................. 366/54–63; 280/704, 81 R, 43.23; 180/209

[56] References Cited

U.S. PATENT DOCUMENTS

| | | | |
|---|---|---|---|
| 3,567,189 | 2/1971 | Buelow | 366/59 X |
| 3,895,818 | 7/1975 | Fearon | 280/81 R |
| 3,912,293 | 10/1975 | Harbers | 280/81 R |
| 4,063,779 | 12/1977 | Martin et al. | 280/81 R X |
| 4,146,243 | 3/1979 | Sims | 280/81 R |
| 4,195,856 | 4/1980 | Larson et al. | 280/704 X |
| 4,350,358 | 9/1982 | Ferris | 280/81 R |
| 4,421,331 | 12/1983 | Ferris | 280/81 R |
| 4,492,389 | 1/1985 | Christenson | 280/704 |
| 4,705,133 | 11/1987 | Christenson et al. | 280/704 X |

Primary Examiner—Harvey C. Hornsby
Assistant Examiner—S. Gerrity
Attorney, Agent, or Firm—Orrin M. Haugen; Thomas J. Nikolai; Frederick W. Niebuhr

[57] ABSTRACT

An auxiliary tag axle assembly for a work vehicle such as a ready-mix concrete truck which is positionable via actuation of a linear actuator to extend the wheel assembly from the rear end of the vehicle's frame to a ground engaging disposition and retractable to a stowed position where the wheels straddle the rear end of the frame and with the auxiliary axle elevated to a position above the level of the bottom of the frame. The need for plural actuators is obviated by utilizing a flexible cable of a predetermined length to effect desired movement of the working parts upon extension and retraction of the main linear actuator.

11 Claims, 5 Drawing Sheets

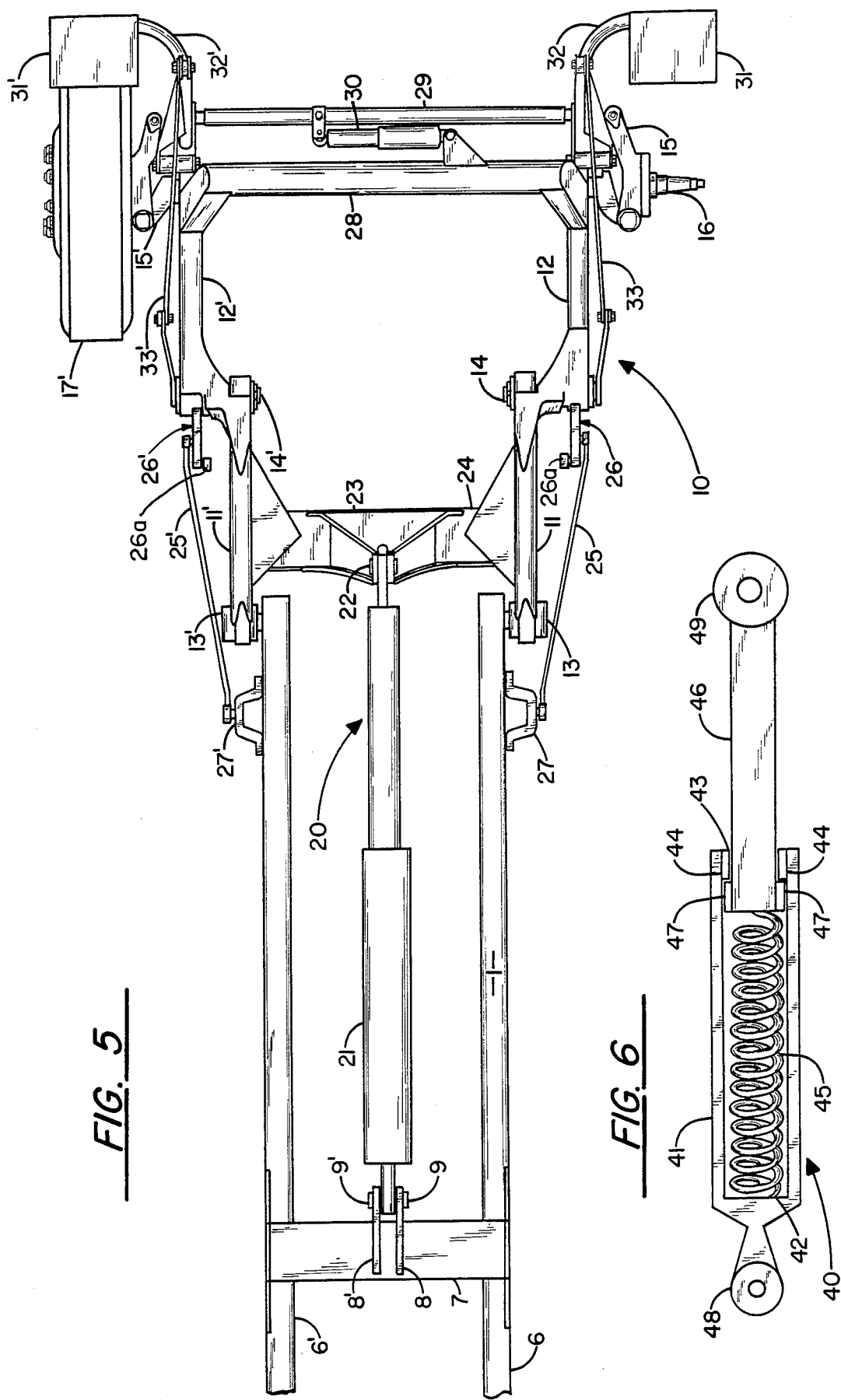

TAG AXLE ASSEMBLY FOR WORK VEHICLES

BACKGROUND OF THE INVENTION

I. Field of the Invention:

This invention relates to an improved auxiliary axle assembly for work vehicles and, in particular, for heavy load transporting vehicles such as ready-mix concrete trucks. More particularly, the improved tag axle assembly of the present invention is designed to attach to the rear end of the frame of a concrete truck so that the tires of the tag axle assembly can be lowered to ground engaging, truck supporting position or retracted to an elevated position so that the wheels straddle the sides of the truck frame above the ground where they will not engage obstacles in the truck's path as it traverses curbs, berms or other rough terrain at an off-road jobsite. Further, since the present invention is designed for use in connection with ready-mix concrete trucks, it incorporates features which permit the concrete delivery chutes of the truck to remain in their extended position irrespective of whether the tag axle assembly is in its raised or lowered position.

II. Discussion of the Prior Art:

In recent years there have been numerous efforts to develop improved tag axle assemblies attachable to heavy trucks so that such trucks can meet governmentally imposed weight restrictions. It has generally been the practice to design such tag axle assemblies so that the wheels can be placed in a ground engaging, truck supporting position while public roads are being traveled and capable of being elevated and stowed once the vehicle is about to leave the public road surface to better enable the truck to travel over rough, uneven and sometimes muddy or soft terrain at a jobsite. Thus, a very important element of any tag axle assembly design is the ability to easily and positively raise the assembly to a position where the assembly will have as much ground clearance as possible, yet maintain the lowest possible center of gravity. Persons skilled in the art have long recognized that there is a constant battle between the desire to elevate the tag axle assembly as high as possible to avoid obstructions yet not elevate the tag axle assembly so high that its weight significantly alters the center of gravity of the vehicle.

Various companies, including applicant's assignee, have patented or are attempting to patent devices to help vehicles meet load limit restrictions. McNeilus Truck and Manufacturing, Inc., for example, is the licensee of U.S. Pat. No. 4,492,389 issued Jan. 8, 1985, and is the owner of U.S. Pat. Application Ser. No. 813,419 (co-pending), filed Nov. 26, 1985 and U.S. Patent Application Ser. No. 006,217 (now U.S. Pat. No. 4,705,133), filed Jan. 23, 1987. As will be made clear from a subsequent discussion of the preferred embodiment, the apparatus of the present invention is somewhat similar to the apparatus described in U.S. Pat. Application Ser. No. 813,419 as well as the apparatus described in U.S. Pat. Application Ser. No. 006,217. However, the present invention is a great improvement over the designs described in these two applications for a variety of reasons. First, the present invention is easier to build and less costly to maintain than the designs described in either of these earlier-filed applications. Second, the apparatus of the present invention provides greater ground clearance than the apparatus described in either of these two applications. Third, the apparatus of the present invention permits the discharge chute of the concrete mixer to be in its extended position when the wheel assembly is being moved from its lower road engaging position to its upper, stowed position or visa versa. Finally, the design of the present invention provides an improved linkage for moving a fender associated with each wheel of the tag wheel assembly as those wheels are moved between their road engaging position and their stowed position.

SUMMARY OF THE PRESENT INVENTION

The present invention is comprised of a new, unique axle arrangement and system of linkages activated by a single linear actuator, such as hydraulic ram, pneumatic piston or air bag. The present invention will permit the tag wheels associated with the tag axle assembly to be elevated from a road engaging and truck supporting position to an alternative position in which the wheels straddle the side of the truck frame so that the lowermost portion of the axle is higher than the bottom of the frame and the tires are sufficiently high to clear uneven terrain yet low enough so as to not present a safety hazard to workmen in the area.

The tag axle assembly of the present invention comprises one or more wheels journaled for rotation on a pair of stub axles. Each stub axle is secured by a king pin assembly to a primary arm member which, in turn, is hingedly attached to one end of a secondary arm member. The secondary arm member is pivotally secured proximate its other end to the frame of the truck. Associated with each second arm member is a bracket. This bracket is secured to the linear actuation means of the apparatus. The linear actuation means (typically a hydraulic or pneumatic ram) is used to move the wheels from their ground engaging position to their retracted position or vice-versa. To ensure proper movement of the primary arms during extension and retraction of the tag axle assembly, two elongated, flexible steel cables are used, one on each side of the vehice . Each such cable is secured at one of its ends to the frame of the truck and at its other end to the corresponding primary arm at or near the point where the primary arm is hinged to the secondary arm. Alternatively, a spring preloaded tie rod can be used instead of the cable.

The apparatus of the present invention also includes unique linkage which enables the mud-deflecting fenders (one associated with each of the wheels) to be moved between two respective positions as the wheels are correspondingly shifted between their stowed and ground-engaging disposition. Also, to enable the cross-tube of the stub axle assembly to be located above the lowermost portion of the frame of the vehicle when the stub axle assembly is in its retracted position, the cross tube member of the stub axle assembly is offset from the secondary arm and secured to the secondary arm by two upwardly extending members. This gives improved ground clearance characteristics to the vehicle and helps prevent damage to the axle and the rods which can occur if those parts are disposed beneath the truck frame. Finally, the apparatus of the present invention includes a pair of rollers associated with the secondary arms. As the apparatus is in the process of being retracted, these rollers engage the rear pedestal holding the concrete mixing drum and adds rotational movement to the tag axle assembly to its stowed position.

OBJECTS

It is accordingly a principal object of the present invention to provide an improved tag axle assembly for a work vehicle such as a ready-mix concrete truck.

A second object of the invention is to provide a tag axle assembly in which the auxiliary wheels thereon, by actuation of a linear actuator, can be moved between a first ground engaging position and second raised position in which the auxiliary wheels thereof straddle the sides of the truck frame at a point high enough where they will not be likely to come into contact with obstacles when on or off the pavement.

A third object of the invention is to provide a novel auxiliary axle assembly in which, when in the stowed position, the lowermost portion of the cross-tube thereof is above the lowermost portion of the vehicles frame.

A fourth object of the invention is to provide a novel auxiliary axle assembly in which each stub axle and its associated wheel are mounted so that they project outwardly from a first arm member, which in turn is hingedly attached to second arm member which is also pivotally secured to the frame of the truck and movable by means of the linear actuator.

A fifth object of the invention is to provide a novel auxiliary axle assembly in which a roller mechanism is used in conjunction with a pedestal of the mixing drum of a ready-mix concrete truck to ensure that the tag axle assembly, when in the retracted position, is properly stowed.

A sixth object of the invention is to provide a rugged, steerable, selectively deployable tag axle assembly for a work vehicle wherein the motion of the tag axle assembly during deployment and stowage thereof is governed at least in part by one or more cables or spring preloaded tie rods pivotally secured at one end to the truck frame and at the other end to one of the members of the frame of the auxiliary wheel assembly whereby only a single linear actuator is required for deploying the auxiliary wheel assembly and retracting it.

These and other objects and advantages of the invention will become apparent to those skilled in the art from the following detailed description of the preferred embodiment when considered in conjunction with the drawings in which like numbers are used to identify corresponding parts in the various views.

DESCRIPTION OF THE DRAWINGS

FIG. 5 is another top view of the improved tag axle assembly in its extended, road engaging position.

FIG. 6 is a view of the spring preloaded tie rod of the present invention.

DESCRIPTION OF THE PREFERRED EMBODIMENT

Figure 1:
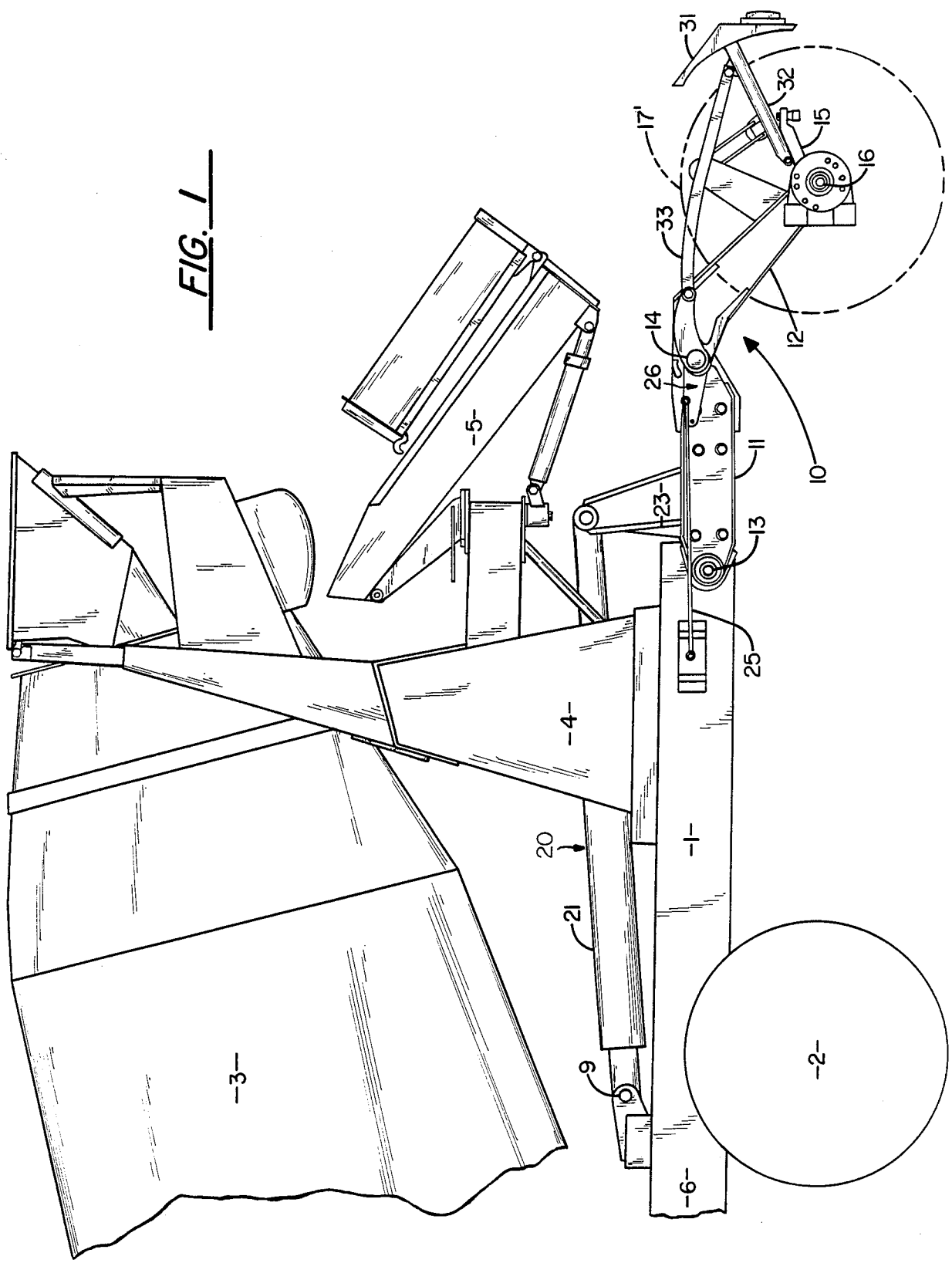
FIG. 1 is a side view of the rear portion of a readymix concrete truck to which the improved tag axle assembly of the present invention is shown as being attached and in its extended, road-engaging position.
Figure 2:
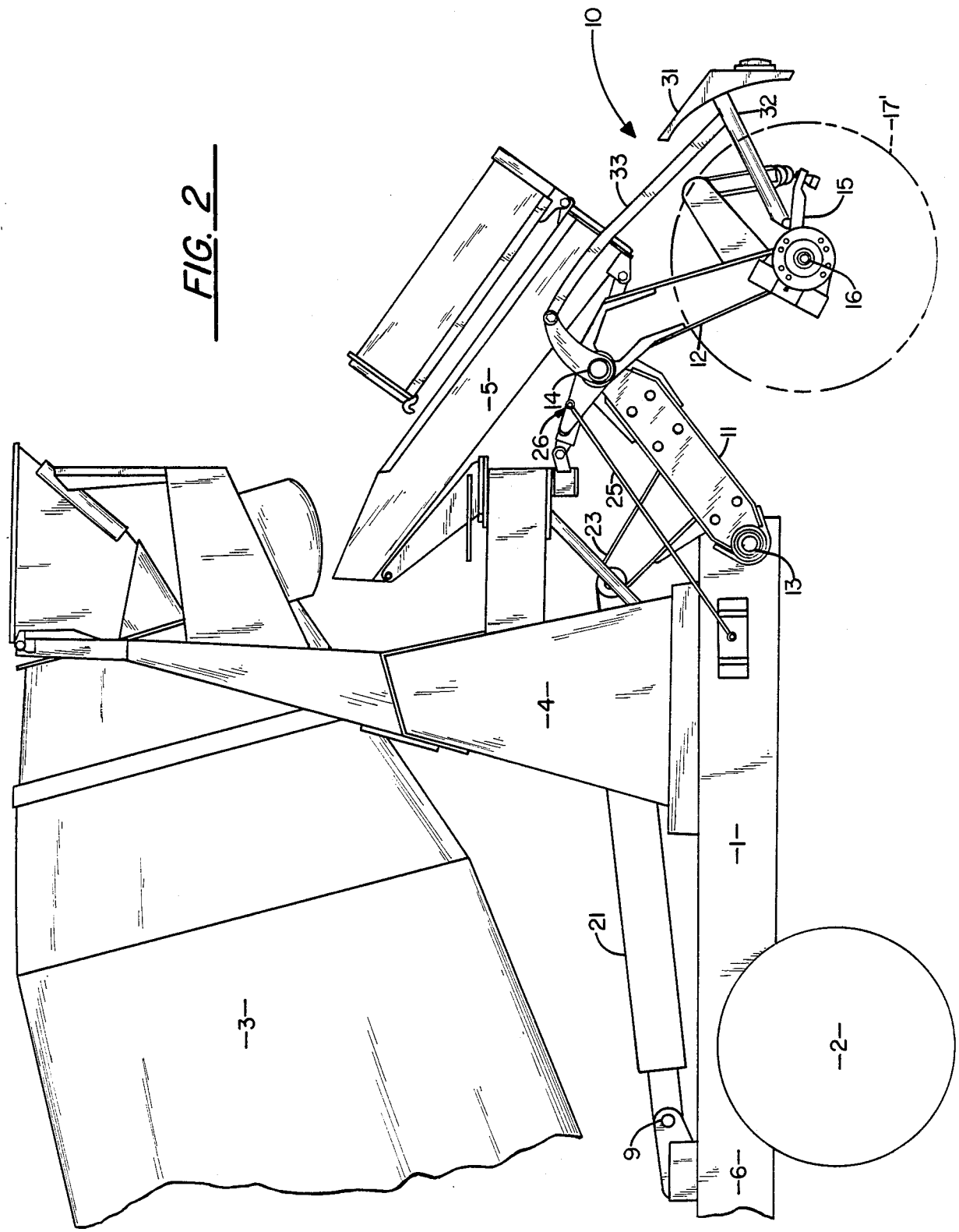
FIG. 2 is another side view of the tag axle assembly of FIG. 1 in a position between its extended position and its retracted position.

As discussed above, the full advantages of the present invention are afforded when it is used in conjunction with a ready-mix concrete truck typical of those found in the prior art. Such concrete trucks generally include a frame 1 having side rails such as 6 and 6'. The frame 1 is supported by a plurality of axles upon the ends of which road engaging wheels 2 have been mounted. Rotatably supported above the frame is a cement or concrete carrying drum 3. In the drawings, only the rearmost support pedestal member 4 for the drum is shown. Typically, cement trucks also include a folding discharge chute 5 for transporting cement being emptied from the drum 3 to a desired location.

The present invention comprises a tag axle assembly which is indicated generally by the numeral 10 in the drawings. The tag axle assembly 10 includes: (a) a pair of primary torque arms 11 and 11', (b) a pair of secondary torque arms 12 and 12', (c) a pivotal connection 13 between frame member 6 and primary torque arm 11, (d) a pivotal connection 13' between frame member 6' and primary torque arm 11', (e) a pivotal connection 14 between the primary and secondary torque arms 11 and 12, (f) a pivotal connection 14' between torque arms 11' and 12'; (g) and king pin assemblies 15 and 15' secured to the respective torque arms 12 and 12'; (h) stub axles 16 and 16' connected to respective king pin assemblies 15 and 15'; and (i) wheels 17 and 17' rotatably mounted on the stub axles or spindles.

Figure 3:
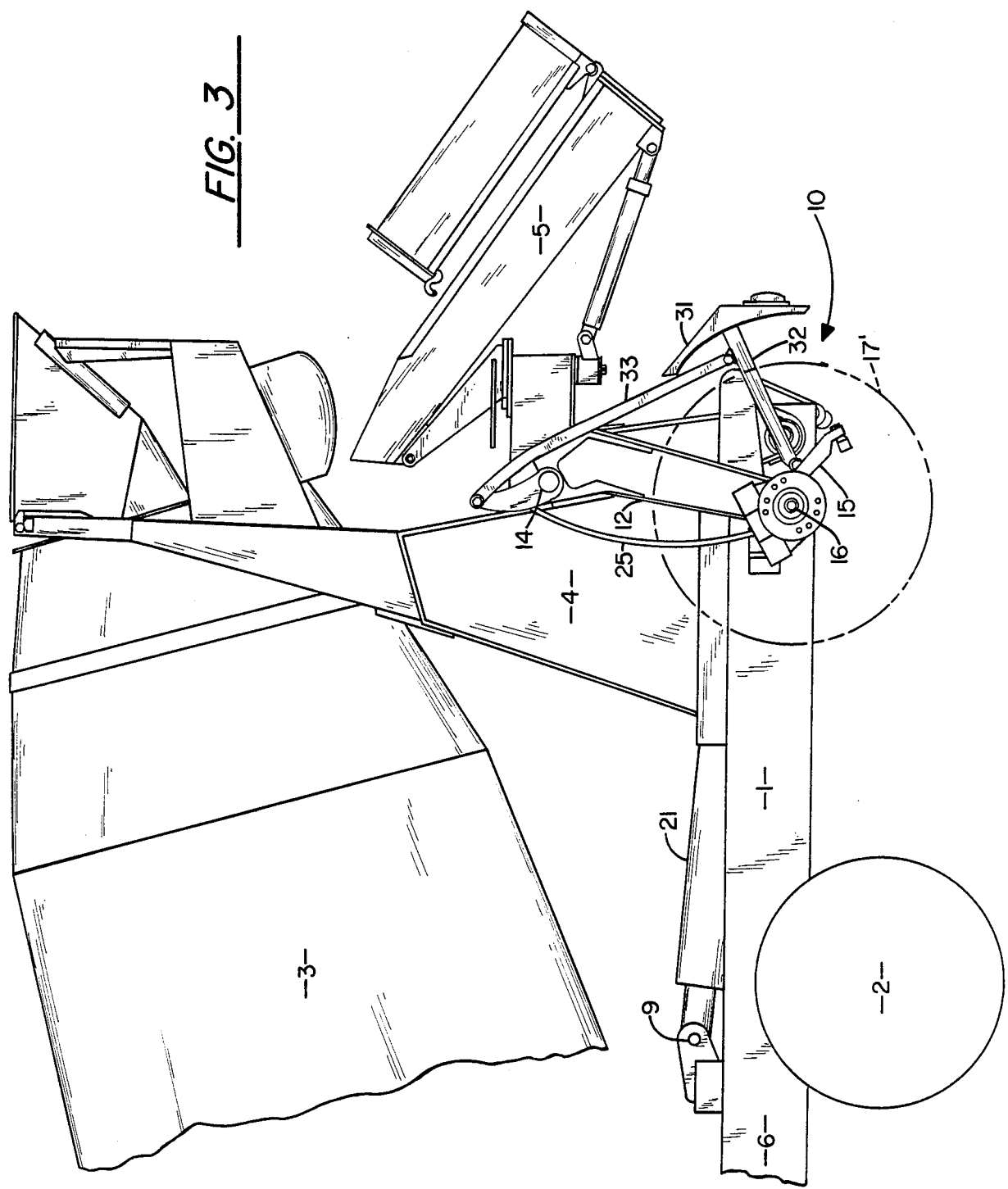
FIG. 3 is still another side view of the tag axle assembly of FIG. 1 with the wheels in their retracted, stowed position.

Other structure important and unique to the present invention includes the linear actuator means, indicate generally by numeral 20, used to move the auxiliary axle assembly 10 between its extended road engaging position shown in FIG. 1 and its retracted, stowed position shown in FIG. 3. In the preferred embodiment, said linear actuator means 20 are comprised of a preferably pneumatic or hydraulic ram having a piston rod 21 which has one of the piston or cylinder pivotally connected to the frame 1 and the other pivotally connected to the tag axle assembly 10. More specifically, the ram 21 is shown as having its cylinder connected at one end to two parallel plates 8 and 8' which project upward from cross-member 7 of the frame 1 forming a clevis. As such, the two plates 8 and 8' and the associated end of the cylinder all have a bore extending therethrough for receiving a pivot pin 9. Pin 9 securely locks the end of the cylinder to the frame yet lets it rotate relative to the frame about pin 9.

The free end of the ram's piston 21 is pivotally attached in a similar fashion to the tag axle assembly 10. The structure used to make this attachment includes a cross member 24 which has its opposite ends bolted to the primary torque arms 11 and 11'. Welded to the middle and projecting upwardly from cross member 24 is horn arm 23. The horn arm 23 has a clevis for receiving the associated end of the ram's piston 21. When the holes in the clevis are aligned with a bore on the end of the piston, a pivot pin 22 is inserted through them to maintain it and the auxiliary axle assembly 10 in assembled relation. This design also permits the piston 21 and auxiliary wheel assembly 10 to pivot with respect to each other.

To aid proper movement of the primary arms 11 and 11' with respect to secondary arms 12 and 12' during retraction and extension, cables 25 and 25' are present. One end of cables 25 and 25' are pivotally secured to the frame members 6 and 6' via pivotal lock members 27 and 27'. The other end of cables 25 and 25' are pivotally secured to, the guide member includes a roller 26(a) which the secondary torque arm 12 near the pivotal connection 14. During retraction or extension of the auxiliary wheels of the auxiliary wheel assembly 10, the guide member 26 does not only coact with the cable 25 pivotally coupled to it to insure proper movement of the torque arms 11 and 12 with respect to each other and the frame, but also the guide member includes a roller 26(a) which engages the rear surface drum support pedestal 4 of the truck, and through such engagement, enhances proper movement of the auxiliary wheels between their stowed and road engaging position.

As an alternative to the use of flexible cables 25 and 25', a spring preloaded tie rod 40 of the type shown in FIG. 6 can be used. Spring tie rod 40 includes a cylindrical casing 41 which has a closed end 42, an open end 43 and a stop member 44 associated with the open end 43. The spring tie rod 40 also includes a spring 45 and a compression bar 46. The compression bar has a stop member 47 associated with one end.

When assembled, the spring 45 and a first end of compression bar 46 are located within the cylindrical casing 41. The spring 45, because it is between the closed end 42 of cylindrical casing 41 and the end of compression bar 46, biases the compression bar 46 away from the cylindrical casing 41. Only stop members 44 and 47 prevent the spring tie rod 40 from becoming disassembled.

When in use, the spring tie rod 40 is mounted in the same fashion as that described above for the flexible cables 25 and 25' with ring 48 being attached to the secondary torque arm 12 and ring 49 being attached to the frame member 6. The primary advantage of the spring tie rod 40 over a conventional tie rod is that the spring tie 40 can be compressed when forces sufficient to overcome the spring force are applied. A solid tie rod, of course, cannot be so compressed and may tend to bend under such force.

For additional strength and rigidity and to maintain a desired spacing between the arms 12 and 12', a tubular cross-member 28 has been added between the secondary torque arms 12 and 12' of the auxiliary axle assembly 10. In the prior art, such cross-supports, when the wheels were retracted to their stowed position, interfere with operation of the chute 5 if disposed above the frame and, if located below the frame, are more likely to engage obstacles in the truck's path. The present invention solves this problem since the cross support member 28 engages the back of the frame 1 above the lowermost portion of the frame when the auxiliary wheel assembly 10 is in the stowed position. This ensures proper clearance of the wheels and also prevents the wheel assembly 10 from being retracted to a position where it will interfere with the discharge chute 5.

This cross-member 28 is also important since it aids in steering the wheels of the auxiliary axle assembly 10. As will be noted from the drawings, a tie rod 29 runs between the two wheels 17 and 17' of the assembly to cause the wheels to move in unison when negotiating a turn. The tie rod 29 and shock absorber 30 help the auxiliary wheels 17 and 17' track properly through turns. A shock absorber 30 is mounted between the tie rod 29 and the cross-member 28 to aid in cushioning and damping oscillation of the rear wheels.

Finally, a fender member 31 has been added with an appropriate linkage 32. The linkage 32 permits the fender to be retracted and extended with the rest of the tag axle assembly 10. As shown in the drawings, the fender and linkage do not interfere with the extension or retraction function of the apparatus of the present invention. Further, they do not interfere with the discharge of cement from the truck's drum 3 into the chute 5 or with the ability of the chute to be swung laterally when the tag axle assembly 10 is elevated and stowed.

Prior art tag axle assemblies were lacking in that the mud guards or fenders used with them interfered with the discharge chute of the vehicle. This is particularly true when the auxiliary wheel assembly is in its retracted position. The auxiliary wheel assembly of the present invention is designed to provide greater clearance between the discharge chute 5 and the fenders 31 as well as the linkage associated with the fenders.

As discussed above, FIGS. 1 and 5 show the auxiliary wheel assembly 10 in its extended, road engaging position. The apparatus is in this position as the vehicle travels over roads with weight restrictions. The wheels are in loaded contact with the ground by virtue of the force applied by the actuator 20 and help support the vehicle. The fenders 31 prevent splashing of mud, water or slush on vehicles or pedestrians located behind a truck so equipped.

Figure 4:
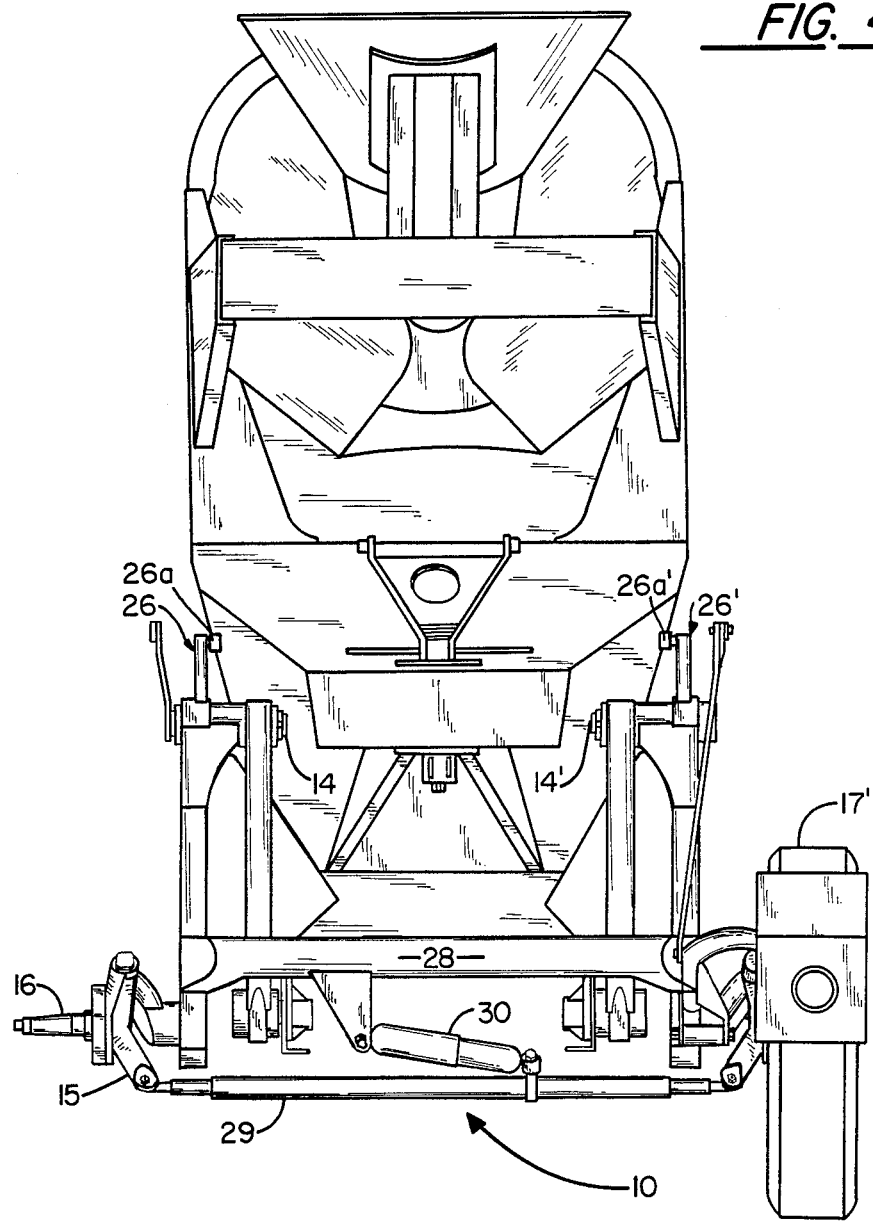
FIG. 4 is a rear view of the improved tag axle assembly in its retracted position.

When the vehicle must travel off road to reach a job site or is traveling empty, it is often desirable to have the auxiliary wheel assembly 10 in the stowed position shown in FIGS. 3 and 4. To accomplish movement of the tag axle assembly 10 from the first predetermined position shown in FIGS. 1 and 5 to the second predetermined position shown in FIGS. 3 and 4, the linear actuator 20 is actuated to effectively shorten its length by telescoping movement of the piston 21 into its cylinder. Retracting the piston 21 causes it to pull back on the horn arm 23. This causes the primary torque arms 11 and 11' to rotate counterclockwise with respect to pivotal connections 13 and 13'. At the same time the secondary torque arms 12 and 12' begin to rotate clockwise about pivotal connections 14 and 14'. Such rotation of the secondary torque arms 12 and 12', however, is controlled by the cables 25 and 25'.

Continued retraction of the piston 21 causes the rollers 26(a) and 26(a)' of the guide members 26 and 26' to come into contact with the rear drum support or pedestal 4. Guide member rollers 26(a) and 26(a)' then roll upwardly along the surface of the rear drum support 4. This rolling causes the secondary torque arms 12 and 12' to continue to rotate about pivotal connections 14 and 14' clockwise in FIG. 3 until the cross member 28 abuts the back of the frame 1 and the stub axles 16 and 16' are above the lowermost portion of the frame 1. This permits the wheels 17 and 17' to be sufficiently elevated so that neither they nor stub axles 16 and 16' are likely to engage any obstacles on the ground also, the linkages 32 and 32' associated with the fenders 31 and 31' keeps the fender in the appropriate position vis a vis the wheels 17 and 17'.

When the auxiliary wheel assembly 10 is in the elevated position shown in FIG. 3, it can be placed in the ground engaging position by reverse actuation of the ram 21 to effectively lengthen it. Lengthening the ram 21 will first cause the primary torque arms 11 and 11' to rotate in a clockwise direction about pivotal connections 13 and 13' respectively. Further, the rollers of the pivotal guide members 26 and 26' will now roll down the rear surface of drum support member 14. This downward rolling causes the secondary torque arms 12 and 12' to begin a counterclockwise rotational movement about pivotal connections 14 and 14'. At a certain point, the cables 25 and 25' come into play. They become taut and force counterclockwise rotation movement of the secondary torque arms 12 and 12' about pivotal connections 14 and 14' to continue even after the rollers of the pivotal guide means 26 and 26' are no longer in contact with the drum support 4. If cables 25 or 25' were not present, further actuation (lengthening) of the ram 21 could cause buckling of the apparatus rather than proper movement to the position in FIG. 1. Again, the fender linkages 32 and 32' keep the fenders 31 and 31' in proper position vis-a-vis the wheels 17 and 17'.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operation procedures, can be accomplished without departing from the scope of the invention itself.

What is claimed is:

1. In combination with a ready-mix concrete truck of the type having (1) a longitudinal extending frame including first and second spaced apart side members supported on a plurality of transversely extending axles, said axles each having one or more wheels affixed to the opposite ends thereof, and (2) a drum for carrying a cement mixture supported above the frame at least in part by a rear support member, an auxiliary wheel assembly for said truck comprised of:
    (a) first and second primary torque arm means, each being pivotally attached at one end thereof to said first and second side members of said frame proximate the rear end of said frame members;
    (b) first and second secondary torque arm means, each pivotally attached at one end thereof to the opposite end of said first and second primary torque arm means;
    (c) first and second stub axle means extending perpendicularly outward from said first and second secondary torque arm means respectively;
    (d) further wheel means journaled for rotation on said first and second stub axle means;
    (e) a transversely extending spacer member having first and second ends connected to said first and second secondary torque arm means respectively;
    (f) a linear actuator means operatively coupled to said first and second primary arm means and to said frame for moving said further wheel means between a ground engaging disposition rearward of the ends of said first and second side members of said frame and an elevated disposition wherein said wheel means straddle the rear portion of said first and second side members of said spacer and said support member is located above the lowermost portion of said frame;
    (g) a guide member pivotally attached at one end to said first side members of the frame and pivotally attached at the other end to at least one of said secondary torque arm means near said pivotal connection between said primary arm means to which it is joined for guiding movement of said primary and secondary arm means during movement of said further wheel means between said ground engaging disposition and said elevated disposition; and
    (h) means associated with said pivotal attachment between said primary and secondary torque arms for engaging said rear support member supporting said drum for further guiding movement of said further wheel means between said ground engaging disposition and said elevated disposition.

2. The combination as in claim 1 wherein said stub axle means are pivotally joined to said first and second secondary torque arms means.

3. The combination as in claim 2 further including tie rod means having respective ends pivotally connected between said first and second stub axle means.

4. The combination as in claim 3 and further including shock absorber means having one end pivotally connected to said tie rod near its center and having its other end pivotally connected to said spacer member to aid in steering said further wheel means.

5. The combination as in claim 1 and further including an additional cable means pivotally attached at one end to a side member of said frame and pivotally attached at its other end to the other of said secondary torque arm means near the pivotal connection between it and its associated primary arm means for guiding movement of said primary and secondary torque arm means during movement of said further wheel means between said ground engaging disposition and elevated disposition.

6. The combination of claim 1 further including fender means associated with said wheel means.

7. The combination of claim 6 further including linkage means associated with said fender means for moving said fender means so that the proper orientation between said fender means and said further wheel means will be maintained as said further wheel means are moved between said ground engaging disposition and said elevated disposition.

8. The combination in claim 1 wherein said actuator means includes a pneumatic ram.

9. The combination as in claim 1 wherein said actuator means includes a hydraulic ram.

10. The combination of claim 1 wherein said guide member is a cable.

11. The combination of claim 1 wherein said guide member is a spring tie rod.

* * * * *